United States Patent [19]

Lin

[11] Patent Number: 4,869,542

[45] Date of Patent: Sep. 26, 1989

[54] SUN VISOR DEVICE FOR SHADING THE REAR WINDOW OF AN AUTOMOBILE

[76] Inventor: Yung-Ching Lin, No. 8, Lane 762, Chun-Shan N. Road, Yung Kung Hsiang, Tainan, Taiwan

[21] Appl. No.: 275,003

[22] Filed: Nov. 22, 1988

[51] Int. Cl.[4] .............................................. B60J 1/20
[52] U.S. Cl. ................................. 296/97.8; 160/370.2
[58] Field of Search .................... 296/97.1, 97.3, 97.7, 296/97.8, 97.9, 97.10, 97.11; 160/370.2, 274

[56] References Cited

U.S. PATENT DOCUMENTS 1,814,293  7/1931  Christie .............................. 296/97.8
4,758,041  7/1988  Labeur ............................... 296/97.8

Primary Examiner—Charles A. Marmor
Assistant Examiner—Richard Camby
Attorney, Agent, or Firm—Irving M. Weiner; Joseph P. Carrier; Robert M. Petrik

[57] ABSTRACT

A sun visor device for shading the rear window of an automobile comprises a seat, a shade roller having an elongated cylindrical housing and a retractable shade body received within said cylindrical housing, a gripping member and a stay rod. The shade body of the shade roller can be pulled out from the cylindrical housing of the shade roller and stretched between the seat member and the gripping member. The seat and gripping member are respectively, fixedly disposed on a platform located under the rear window of the automobile and an inside rubber rib connected to the roof panel of the automobile and biased by the stay rod connected therebetween. Whereby, the sun visor device can be quickly and easily installed and dismantled without the need of drilling holes in the interior surface of the automobile.

3 Claims, 6 Drawing Sheets

SUN VISOR DEVICE FOR SHADING THE REAR WINDOW OF AN AUTOMOBILE

BACKGROUND OF THE INVENTION

1. Field of the Invention

This invention relates to a sun visor device, more particularly to a sun visor device for shading the rear window of an automobile which can be easily and quickly installed and dismantled.

2. Description of the Relevant Art

Referring now to FIGS. 1 and 2, a conventional sun visor device comprises a shade roller A and a hanger B. The shade roller A has a retractable shade body A1 which can be pulled out by means of a pull shank A2 having a hole A21 formed therein. The shade roller A is affixed to a platform C1 interposed between the rear window C2 of an automobile C and the back of rear seat C3 of the automobile C by means of two fastening seats A3 which are fastened to the platform C1 by screws A4. The hanger B is provided with a hook B1 and is fixed to the roof panel C4 of the automobile C by a screw D. In this respect, the shade body A1 can be stretched so as to shade the rear window C2 of the automobile C when the hole A21 of the pull shank A2 is grasped by the hook B1. This kind of sun visor device suffers from the following disadvantages:

(1) To respectively fix the fasten seat A3 and the hanger B to the platform C1 and the roof panel C4 of the automobile C, the screws A4, D must be screwed into the body of the automobile C. In this way, the interior surface of the automobile C will be damaged by drilling.

(2) It takes a lot of labor to install such a sun visor device since the installation of the sun visor device comprises the steps of precisely drilling holes in the platform C1 and the roof panel C4 at predetermined positions, respectively aligning the screws A4 and D with the holes drilled in the platform C1 and the roof panel C4, and screwing said screws into said drilled holes. Such a complicated installation procedure naturally increases labor costs.

SUMMARY OF THE INVENTION

It is therefore a main object of this invention to provide a sun visor device which can be both easily and quickly installed and dismantled without the need of drilling holes in the interior surface of the automobile.

Accordingly, a sun visor device according to this invention enables shading of the rear window of an automobile wherein the automobile has an inside rubber rib protruded between the roof panel of said automobile and the rear window; and a platform interposed between the rear window and the back of the rear seat of the automobile.

The sun visor device includes:

a stay rod having a first and a second end, a shade roller comprising a retractable shade body, and an elongated housing for receiving the retractable shade body. The shade body has a pull member connected to one end thereof so that the retractable shade body can be pulled out from the elongated housing by means of the pull member.

A seat is provided having a bottom side and a top side, the bottom side has a plurality of protrusions formed thereon so as to achieve frictional contact between the seat and the platform of the automobile. The top side has a cavity for receiving the first end of the stay rod and a concave portion adapted to transversely hold and retain the elongated housing of the shade roller.

A gripping member is provided having a top side and a bottom side. The top side of the gripping member is shaped to abut against said rib of the automobile. The bottom side of the gripping member has a cavity for receiving the second end of the stay rod and a concave portion adapted to retain the pull member of the shade roller.

Therefore, the shade body can be pulled out from the shade roller and stretched between the seat and the gripping member which are, respectively, fixedly disposed on the platform and the inside rubber rib and biased by the stay rod which is connected therebetween. Thus, according to this invention said sun visor can be both easily and quickly installed by making the stay rod bias between said seat and said gripping member which are respectively and fixedly disposed on the platform and the inside rubber rib. Besides, said sun visor device can also be dismantled by releasing the stress exerted on the stay rod.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
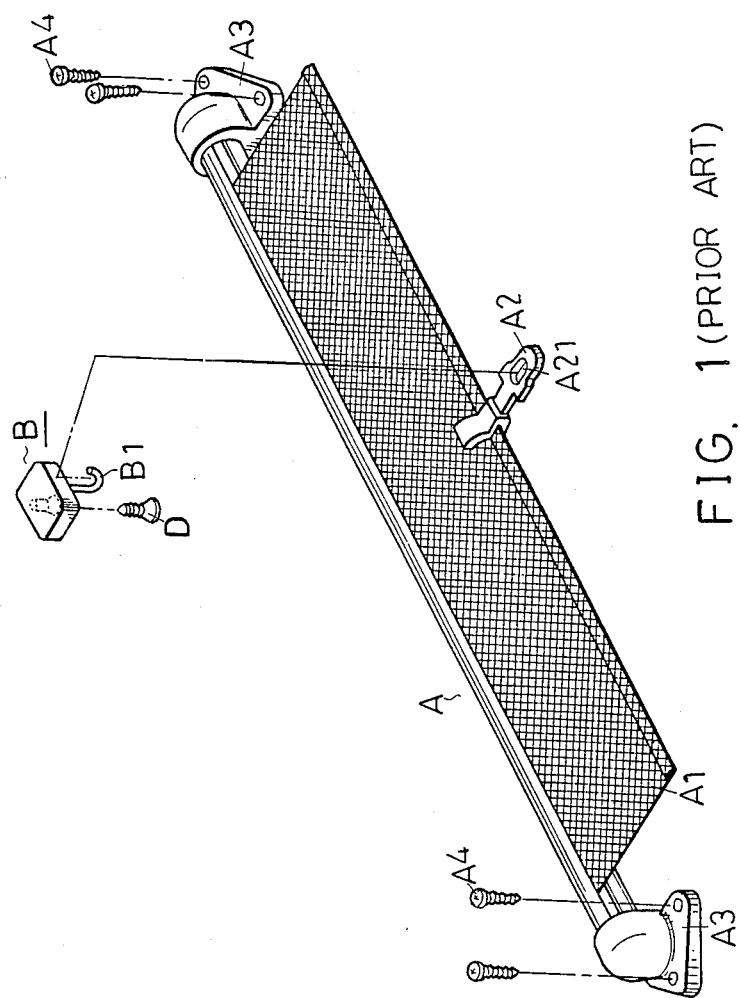
FIG. 1 is a exploded perspective view of a conventional sun visor device.
Figure 2:
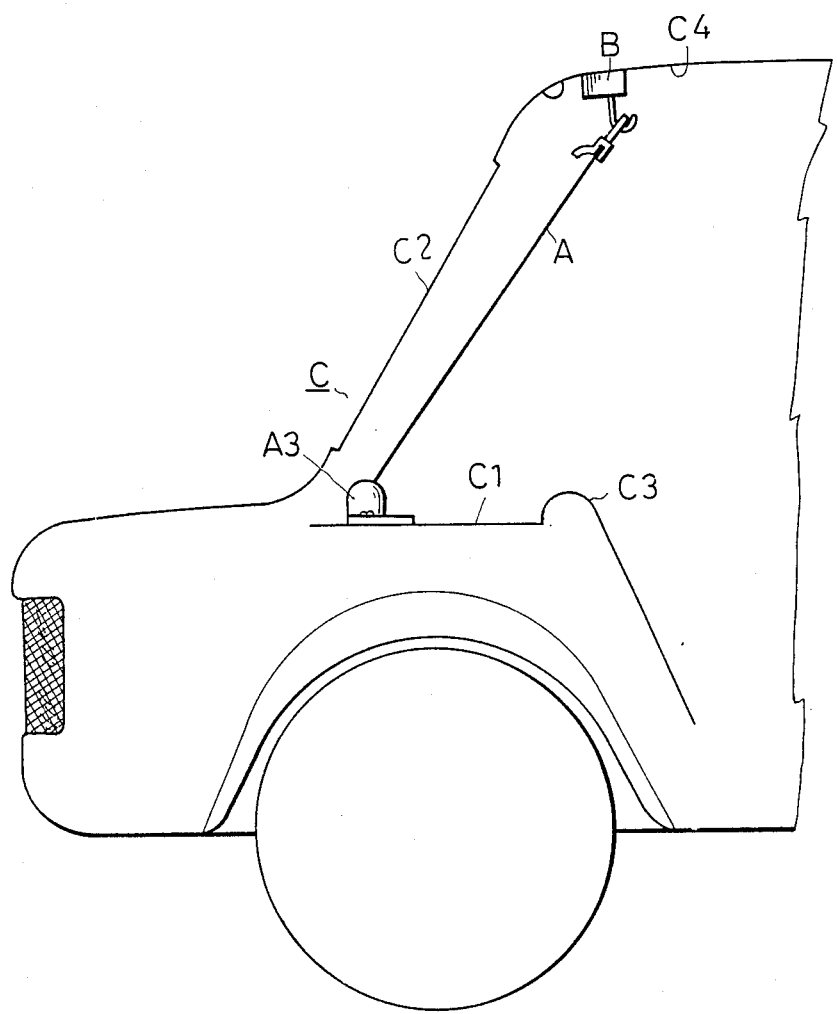
FIG. 2 is a schematic side view of the conventional sun visor device showing said conventional sun visor device in an operation position.
Figure 3:
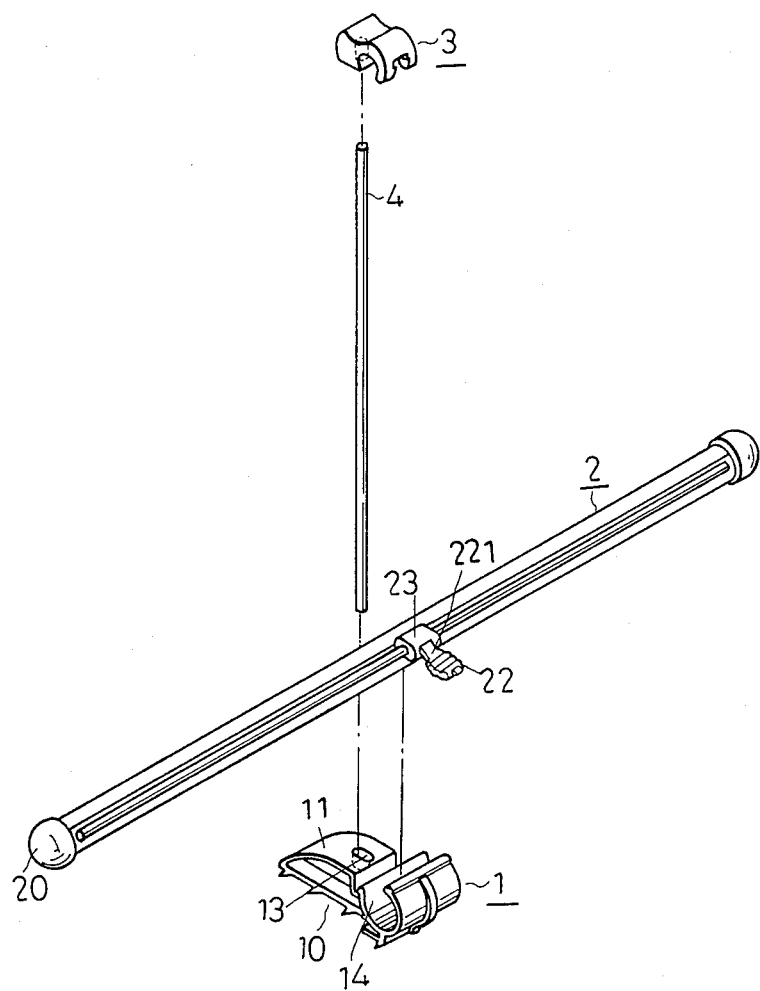
FIG. 3 is a exploded view of a preferred embodiment of a sun visor device according to the present invention.
Figure 4:
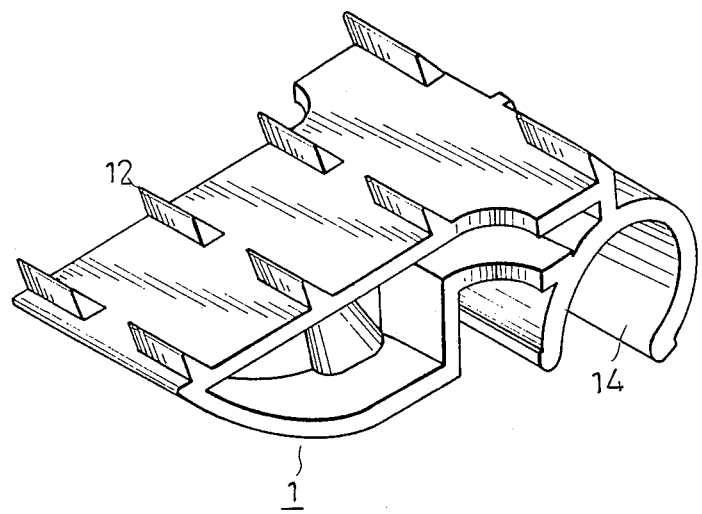
FIG. 4 is a perspective view of a seat of the sun visor device according to the present invention.

Referring to FIG. 3, an exploded view of a preferred embodiment of a sun visor device according to the present invention is shown. The sun visor device comprises a seat 1, a shade roller 2 having an elongated cylindrical housing 20, a retractable shade body 21 (see FIG. 7) which is received within said cylindrical housing 20, a gripping member 3, and a stay rod 4. The seat 1 has a bottom side 10 and a top side 11. The bottom side of seat 1 has rows of triangular ribs 12 protruding therefrom and ribs 12 are tilted in the same direction, in a manner as best shown in FIG. 4. A cavity 13 and a concave portion 14, are both formed on the top side 12 of the seat 1. Cavity 13 accepts one end of rod 4 and concave portion 14 is adapted to transversely receive the elongated cylindrical housing 20 of the shade roller 2. The retractable shade body 21 of the shade roller 2 has a pull member 22 connected at one end thereof so that the retractable shade body 21 can be pulled out from the elongated cylindrical housing 20 by pull member 22. Pull member 22 is a flexible flat strip 221 attached at one end to a rectangular shaped portion 23 which is in turn attached at one end to the shade body 21.

Figure 5:
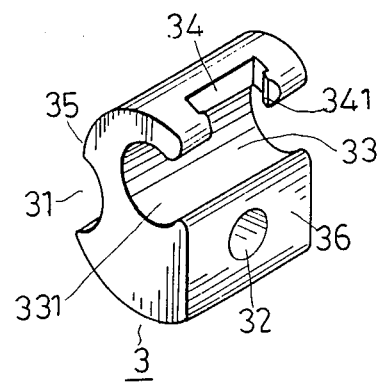
FIG. 5 is a perspective view of a gripping member of the sun visor device according to the present invention.

Referring to FIG. 5, a perspective view of the gripping member 3 having a top side 35 and a bottom side 36 is shown. A concave portion 31 with an arcuate surface is formed on top side 35 of the gripping member 3. Said bottom side 36 of gripping member 3 has a cavity 32 and a transverse through bore 33 with a groove 331 which opens onto the bottom side 36 of gripping member 3. A notch 34, longitudinally communicated with said transverse through bore 33, has a jaw 341 which opens onto the bottom side 36 of gripping member 3. In this respect, rectangular portion 23 and flexible flat strip 221 of the pull member 22 can be respectively inserted into and be retained by said transverse through bore 33 and the notch 34 since the width of groove 331 of the transverse through bore 33 and jaw 341 of the notch 34 are respectively narrower than the broader sides of rectangular portion 23 and said flexible flat strip 221 of the pull member 22. That is, if the narrower sides of rectangular portion 23 and said flexible flat strip 221 of the pull member 22 are respectively facing groove 331 of the transverse through bore 33 and jaw 341 of the notch 34, they can respectively pass through groove 331 and jaw 341. If the broader sides of rectangular portion 23 and flexible flat strip 221 of the member 22 are respectively facing said groove 331 and the jaw 341, they will not be able to respectively pass through groove 331 and jaw 341.

Figure 6:
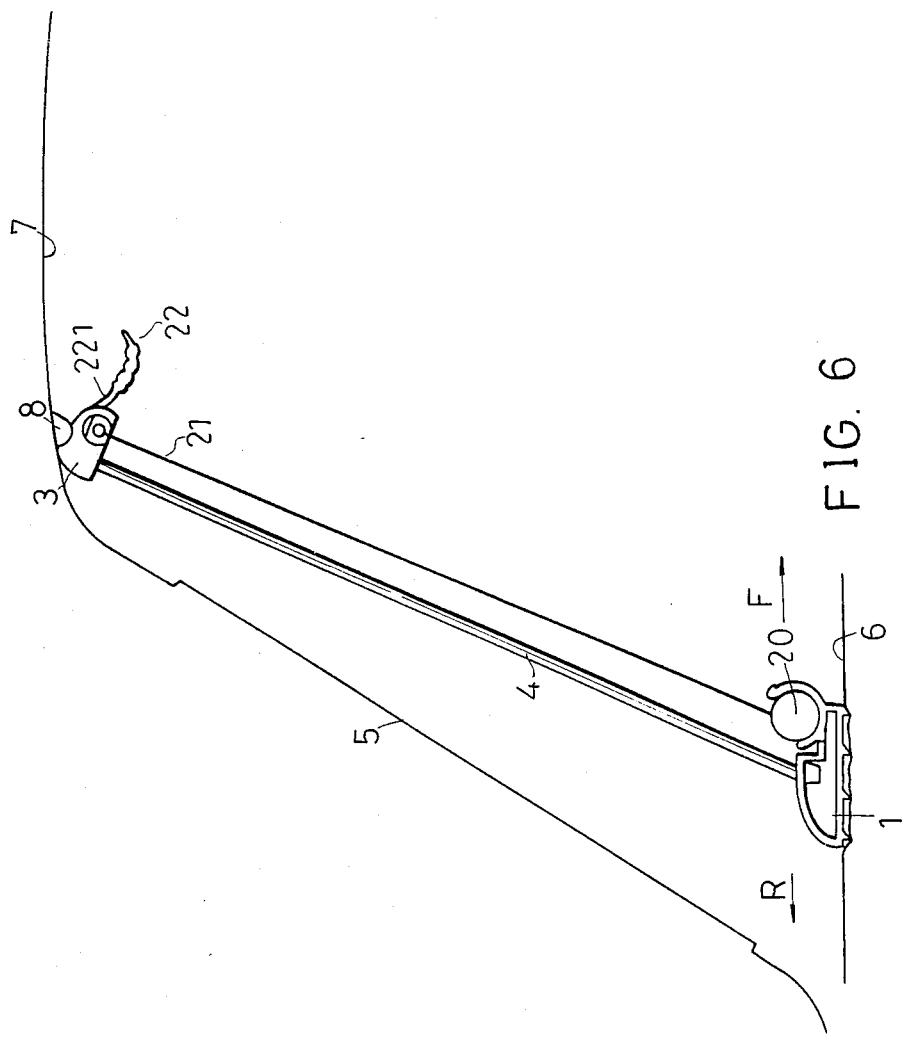
FIG. 6 is a schematic side view of a preferred embodiment of a sun visor device according to the present invention showing the sun visor device in an operation position.
Figure 7:
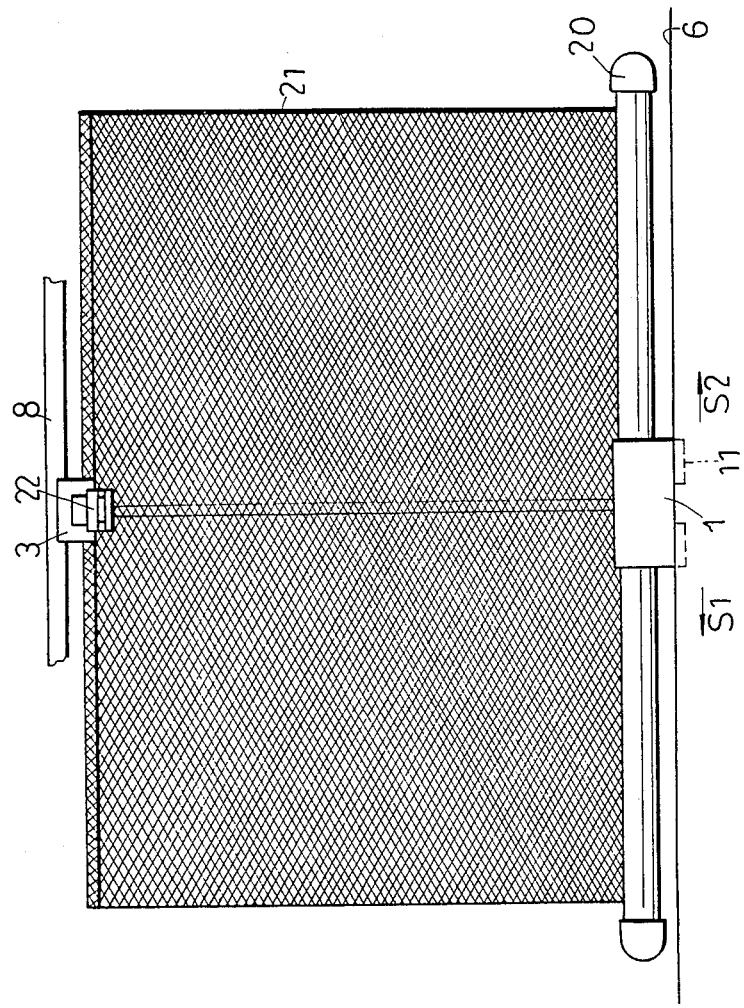
FIG. 7 is a front view of a preferred embodiment of a sun visor device according to the present invention showing the sun visor device in an operation position.

In accordance with the present invention, the assembled sun visor device for shading the rear window of an automobile is shown in FIGS. 6 and 7. Shade body 21 of the shade roller 2 is pulled out from cylindrical housing 20 of shade roller 2 and stretched between seat 1 and the gripping member 3 which are respectively and fixedly disposed on a platform 6 located under the rear window 5 of the automobile and an inside rubber rib 8 connected to the roof panel 7 of the automobile and biased by stay rod 4 which is connected therebetween, wherein said platform is usually provided with a layer of soft cloth thereon. In this case, said seat 1 is first disposed on the soft cloth surface of said platform 6 with rows of triangular ribs 12 tilted rearward, (in a direction indicated by arrow R in FIG. 6). One end of the stay rod 4 is inserted into cavity 13 of the seat 1 and the other end of stay rod 4 is inserted into cavity 32 of the gripping member 3 so as to force cancave portion 31 of said gripping member 3 to fixedly abut against said inside rubber rib 8. The seat 1 is then pushed forwardly, in a direction indicated by arrow F, along platform 6 until the seat cannot be moved further. In this respect, the stay rod is rearwardly inclined and is biased between seat 1 and gripping member 3. Meanwhile, the seat 1 firmly abuts against platform 6 achieving a frictional contact between the rows of triangular ribs 12 and the soft cloth surface of said platform 6. Next, the shade body is pulled out from housing 20 and stretched so as to screen rear window 5 by pull member 22 when said rectangular portion 23 and flexible strip 221 of the pull member 22 are respectively inserted into and are retained by transverse through bore 33 and notch 34 in a manner as described hereinbefore. When the sun device is not in use, retractable shade body 21 can be received into cylindrical housing 20 of the shade roller 2 by turning the narrower sides of flexible flat strip 221 and the rectangular portion 23 of the pull member 22, in turn, to face the jaw 341 of notch 34 and the groove 331 of the transverse through bore 33 and then releasing pull member 22 from gripping member 3. Moreover, seat 1, gripping member 3 and stay rod 4 can be dismantled by moving seat 1 either left or right, (in the directions indicated by arrow S1, S2 in FIG. 7), so as to release the force exerted on the platform 6.

It can be seen that this invention offers an extremely simple and easy way to install and dismantle the sun visor device without the need of drilling holes in the interior surface of the automobile.

With the present invention thus described, it is apparent that numerous modifications and variations can be made without departing from the scope and spirit of this invention. It is therefore intended that this invention be limited only as indicated in the appended claims.

I claim:

1. A sun visor device for shading the rear window of an automobile, said automobile having an inside rubber rib protruded between the roof panel of said automobile and said rear window, and a platform interposed between said rear window and the back of the rear seat of said automobile, said sun visor device comprising:
    a stay rod having a first and a second end;
    a shade roller comprising a retractable shade body and an elongated housing for receiving said retractable shade body, said shade body having a pull member connected to the end of said retractable shade body so that said retractable shade body can be pulled out from said elongated housing by said pull member;
    a seat having a bottom side and a top side, said bottom side having a plurality of protrusions formed thereon so as to achieve frictional contact between said seat and said platform of said automobile, said top side having a cavity for receiving the first end of said stay rod and a concave portion adapted to transversely hold and retain said elongated housing of said shade roller; and
    a gripping member having a top side and a bottom side, said top side of said gripping member being shaped to abut against said rib of said automobile, said bottom side of said gripping member having a cavity for receiving the second end of said stay rod and a concave portion adapted to retain said pull member of said shade roller;
whereby said shade body can be pulled out from said shade roller and stretched between said seat and said gripping member which are, respectively, fixedly disposed on the platform and the inside rubber rib and biased by said stay rod which is connected therebetween.

2. A sun visor device as claimed in claim 1, wherein said plurality of protrusions formed on said bottom side of said seat are rows of triangular ribs.

3. A sun visor device as claimed in claim 1, wherein said pull member of said shade roller has a flexible flat strip longitudinally connected with a rectangular portion, and said concave portion of said gripping member is a transverse through bore with a groove which opens onto said bottom side of said gripping member and the bottom side of said gripping member has a notch longitudinally communicated with said groove of said transverse through bore having a jaw which opens onto said bottom side of said gripping member, so that said rectangular portion and said flexible flat strip of said pull member can respectively be inserted into and be retained by said transverse through bore and said notch of said gripping member since the width of said groove of said transverse through bore and said jaw of said notch is respectively narrower than the broader sides of said rectangular portion and said pull member.

* * * * *

UNITED STATES PATENT AND TRADEMARK OFFICE
CERTIFICATE OF CORRECTION

PATENT NO. : 4,869,542
DATED : September 26, 1989
INVENTOR(S) : Yung-Ching LIN

It is certified that error appears in the above-identified patent and that said Letters Patent is hereby corrected as shown below:

Column 2, line 20, change "Besides" to --Additionally--;
line 29, change "a" (first occurrence) to --an--;
line 34, change "a" (first occurrence) to --an--;
line 62, after "top side" change "12" to --11--.

Column 3, line 28, after "221 of the" insert --pull--;
line 48, change "cancave" to --concave--.

Signed and Sealed this

Twelfth Day of February, 1991

Attest:

HARRY F. MANBECK, JR.

Attesting Officer     Commissioner of Patents and Trademarks